United States Patent [19]

Kim

[11] Patent Number: 5,684,770
[45] Date of Patent: Nov. 4, 1997

[54] USER TABLE OF CONTENTS DATA RECOVERING METHOD OF A RECORDABLE OPTICAL DISC DRIVING APPARATUS

[75] Inventor: Jong-Woon Kim, Suwon, Rep. of Korea

[73] Assignee: Samsung Electronics Co., Ltd., Kyungki-do, Rep. of Korea

[21] Appl. No.: 565,819

[22] Filed: Dec. 1, 1995

[30] Foreign Application Priority Data

Dec. 5, 1994 [KR] Rep. of Korea ............... 32814/1994

[51] Int. Cl.[6] .................... G11B 19/02; G11B 27/034
[52] U.S. Cl. .................. 369/47; 369/32; 369/83; 360/72.2; 360/78.14; 360/13; 360/31
[58] Field of Search .................. 360/72.2, 78.14, 360/13, 15, 31, 49; 369/32, 54, 58, 60, 47, 83, 84, 48, 50

[56] References Cited

U.S. PATENT DOCUMENTS

| | | | |
|---|---|---|---|
| 4,996,678 | 2/1991 | Maeda | 369/32 |
| 5,377,167 | 12/1994 | Maeda | 369/47 |
| 5,410,526 | 4/1995 | Maeda | 369/48 |

*Primary Examiner*—Aristotelis M. Psitos
*Assistant Examiner*—Alan Faber
*Attorney, Agent, or Firm*—Sughrue, Mion, Zinn, Macpeak & Seas, PLLC

[57] ABSTRACT

A method for recovering a user table of contents data for use by an optical disc driving apparatus which records data in a data record area of an optical disc. The method regenerates the data recorded in the data record area and records information relative to the regenerated data in the user table of contents data record area of the optical disc.

4 Claims, 5 Drawing Sheets

USER TABLE OF CONTENTS DATA RECOVERING METHOD OF A RECORDABLE OPTICAL DISC DRIVING APPARATUS

BACKGROUND OF THE INVENTION

1. Field of the Invention

The present invention relates to a recordable optical disc driving apparatus, and more particularly to a method for recovering the user table of contents relative to data recorded in an optical disc.

2. Description of Related Art

FIG. 1 is a block diagram showing a recordable optical disc driving apparatus for recording data on a recordable optical disc and regenerating the recorded data.

Referring to FIG. 1, data to be recorded are quantized through an analog/digital (A/D) converter 30, compressed in the ratio of 1/5 through a 15 compression/expansion processor 28, and stored at a buffer RAM 26 through a memory controller 24. The buffer RAM 26 functions to control the difference of transmission speed between the compressed data and the data to be recorded, and to prevent shock. The data stored at the buffer RAM 26 are applied to an EFM, CIRC encoder/decoder (Eight to Fourteen Modulation, Cross Interleave Reed-Solomon Code Encoder/Decoder) 20 under the control of the memory controller 24. At this time, auxiliary data such as 1) the scrambling and sync pattern of the applied data and 2) sub-header data, and auxiliary data such as the parity and time code for error detection and error correction, are temporarily stored at the buffer RAM 26, applied to the data to be recorded and then EFM modulated at the EFM, CIRC encoder/decoder 20. Then, the EFM-modulated data are recorded in the record area of a disc 2 through a head driver 6 and a head 4.

The signal regenerated from the disc 2 through a pickup 12 is applied to the EFM, CIRC encoder/decoder 20 through an RF amplifier 16 and an address decoder 18. At this time, the EFM, CIRC encoder/decoder 20 performs the error detection and error correction of the applied data and extracts auxiliary data, such as a time code. After completing the error correction, the EFM, CIRC encoder/decoder 20 detects a sync pattern from the error corrected data, and then extracts data and auxiliary data through descrambling. The extracted data are stored at the buffer RAM 26 under the control of the memory controller 24, and the data stored at the buffer RAM 26 are synchronized with the output data time of the compression/expansion processor 28 and then are expanded at the compression/expansion processor 28. The expanded data are converted into an analog signal through a D/A converter 32.

The recordable optical disc 2 is typically a mini-disc which is divided into a lead-in area, user table of contents (UTOC) data area, record area and lead-out area.

The lead-in area is named a TOC (Table of Contents) data area in which information on the disc, e.g., disc type, start address of the record area, start address of the UTOC data area and start address of the lead-out area is recorded. The UTOC data area records information on the data recorded by the user, e.g., in case of an audio data, the total number of recorded music pieces, each and total playback time of recorded music pieces, and the addresses of a first part and index part of each music piece. The record area records the data recorded by the user, and the lead-out area records the signal displaying the completion of the program.

The buffer RAM 26 of FIG. 1 is divided into data areas corresponding to respective areas in the disc 2. FIG. 2 shows the construction of the data areas in the buffer RAM 26. The buffer RAM 26 is divided into a TOC data area 230 corresponding to the lead-in area of the disc 2, a UTOC data area 220 corresponding to the UTOC data area of the disc 2, and a record data area 210 corresponding to the record area of the disc 2.

The system controller 22 of the optical disc driving apparatus records or edits the audio data to be recorded in the record area of the disc 2, and then records the information on the track of the disc 2 in the UTOC data area.

In the case that the optical disc driving apparatus is abnormal, for example, if the power is off while recording data, the data can be recorded in the record area, but the information on the recorded data may not be recorded in the UTOC data area. An error data area 214 in the record data area 210 of FIG. 2 is the area in which the data are recorded in the case that the operation of the optical disc driving apparatus is abnormal, and a main data area 212 is the area in which the data are recorded in case of normal operation of the optical disc driving apparatus. Under these conditions, as the user cannot check the contents recorded or edited in the record area of the disc 2 from the user table of contents data displayed on the display (not shown) connected to the system controller 22, the additionally recorded or edited data cannot be regenerated.

Thus, a problem occurs in that the recorded data become damaged, making it necessary to again record or edit the data to overcome this problem. This results in troublesome recording or editing.

SUMMARY OF THE INVENTION

It is therefore an object of the present invention to provide a method for recovering user table of contents data relative to data recorded in a record area of a disc by using the data recorded in the record area.

It is another object of the present invention to provide a method for protecting the data recorded in the record area of the disc, even when an error occurs while recording the user table of contents data relative to the data recorded in the record area.

It is still another object of the present invention to provide a method for generating the data recorded in the record area of the disc without rerecording the recorded data, even when an error occurs while recording the user table of contents data relative to the data recorded in the record area.

In accordance with the above objects of the present invention, there is provided a user table of contents data recovering method of an optical disc driving apparatus which records data in the data record area of the optical disc, for regenerating the data recorded in the data record area and recording information relative to the regenerated data in the user table of contents data record area of the optical disc.

The optical disc driving apparatus of the present invention comprises a RAM for storing data to be recorded, and the optical disk has a data record area for recording the data outputted from the RAM and a user table of contents data record area for recording the information relative to the data recorded in the data record area.

In addition, the user table of contents data recovering method of the optical disc driving apparatus, for recovering the information relative to the data recorded in the data record area by using the data recorded in the data record area, comprises the steps of initializing a user table of contents data area of the RAM corresponding to the user table of contents data record area, of regenerating the data recorded in the data record area and then storing the regenerated data in a predetermined position of the data area in the RAM, and of recovering the user table of contents data relative to the data stored in the data area of the RAM and recording the recovered data in the user table of contents data record area of the optical disc.

BRIEF DESCRIPTION OF THE DRAWINGS

In the detailed description of the preferred embodiment of the present invention presented below, reference is made to the accompanying drawings, in which.

DETAILED DESCRIPTION OF THE PREFERRED EMBODIMENT

Figure 1:
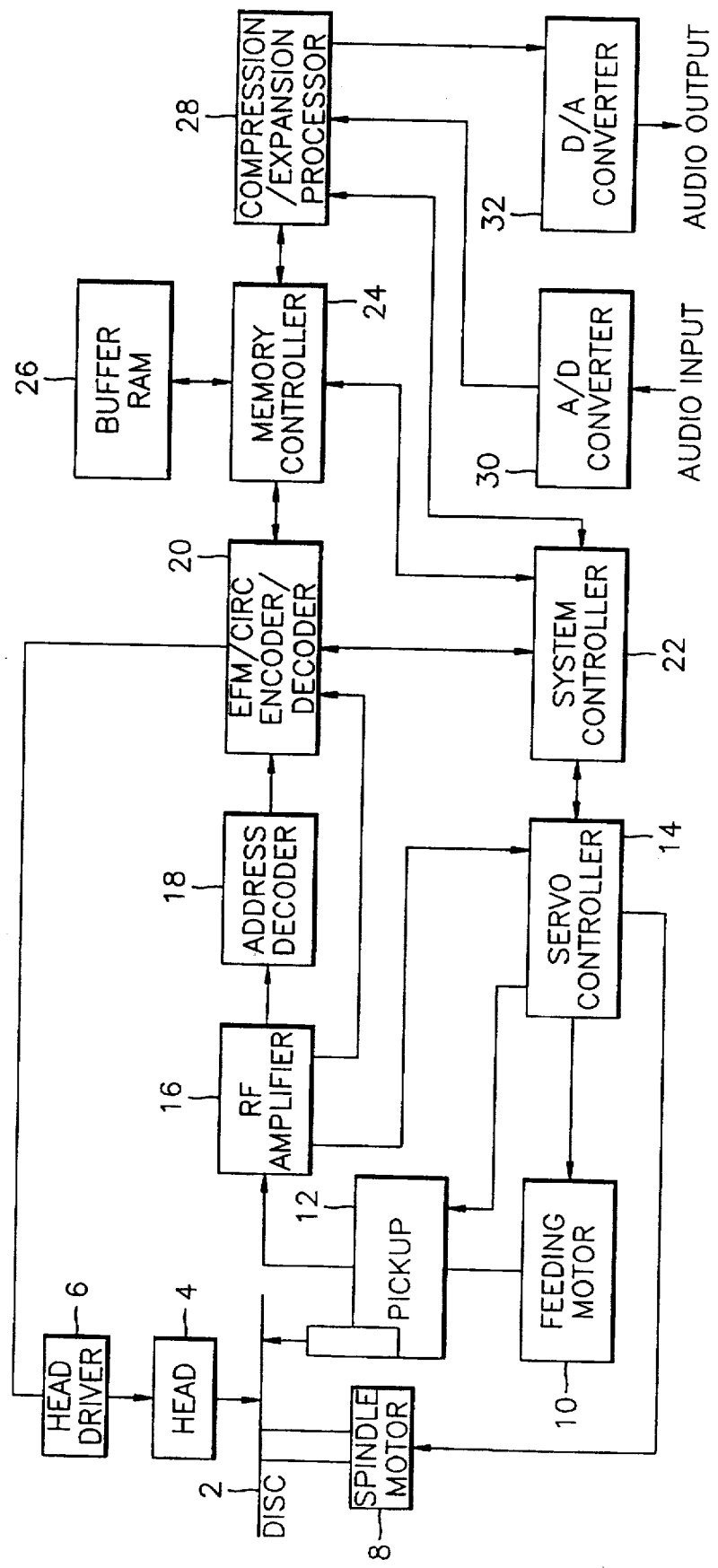
FIG. 1 is a block diagram showing a general recordable optical driving apparatus.
Figure 2:
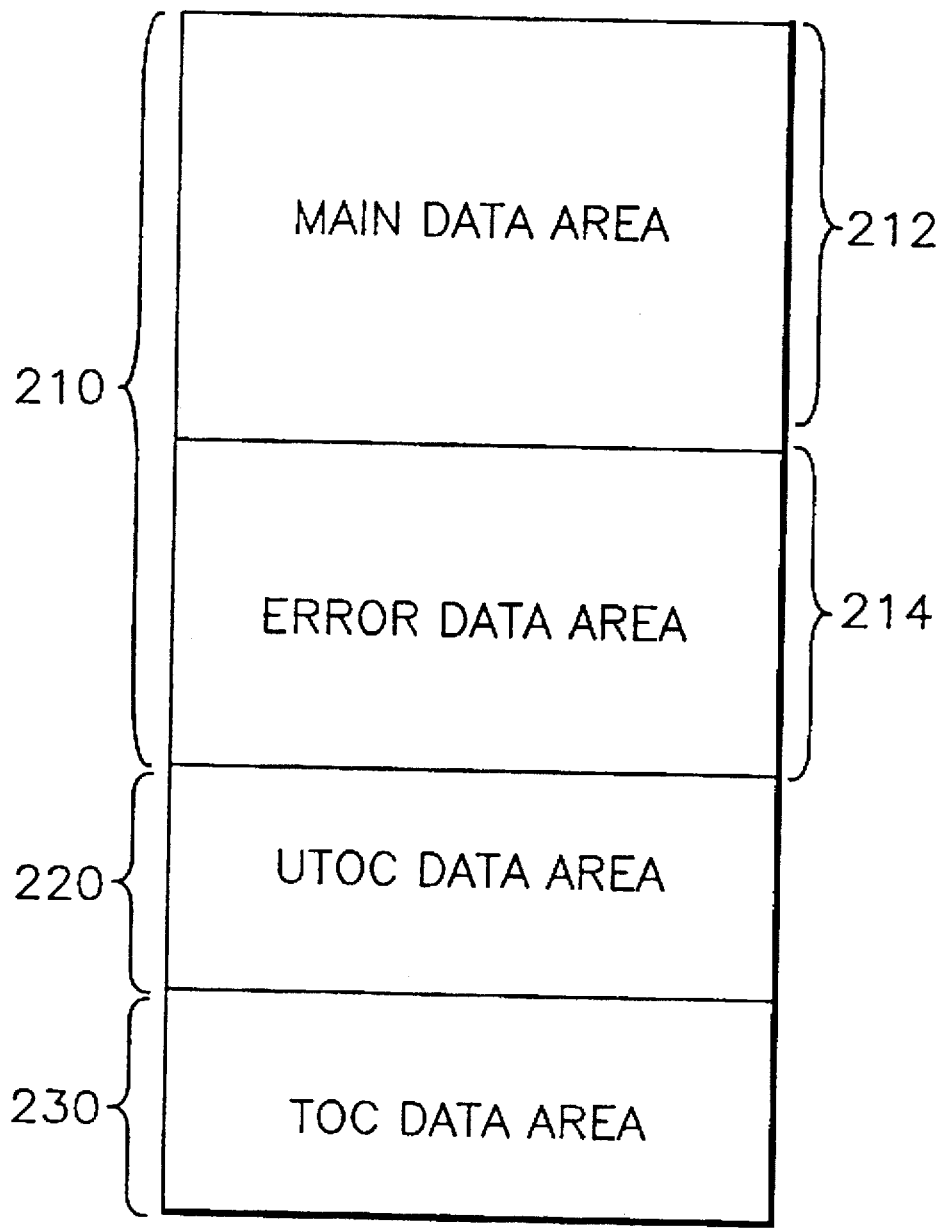
FIG. 2 is a diagram showing construction of a buffer RAM of FIG. 1.
Figure 3:
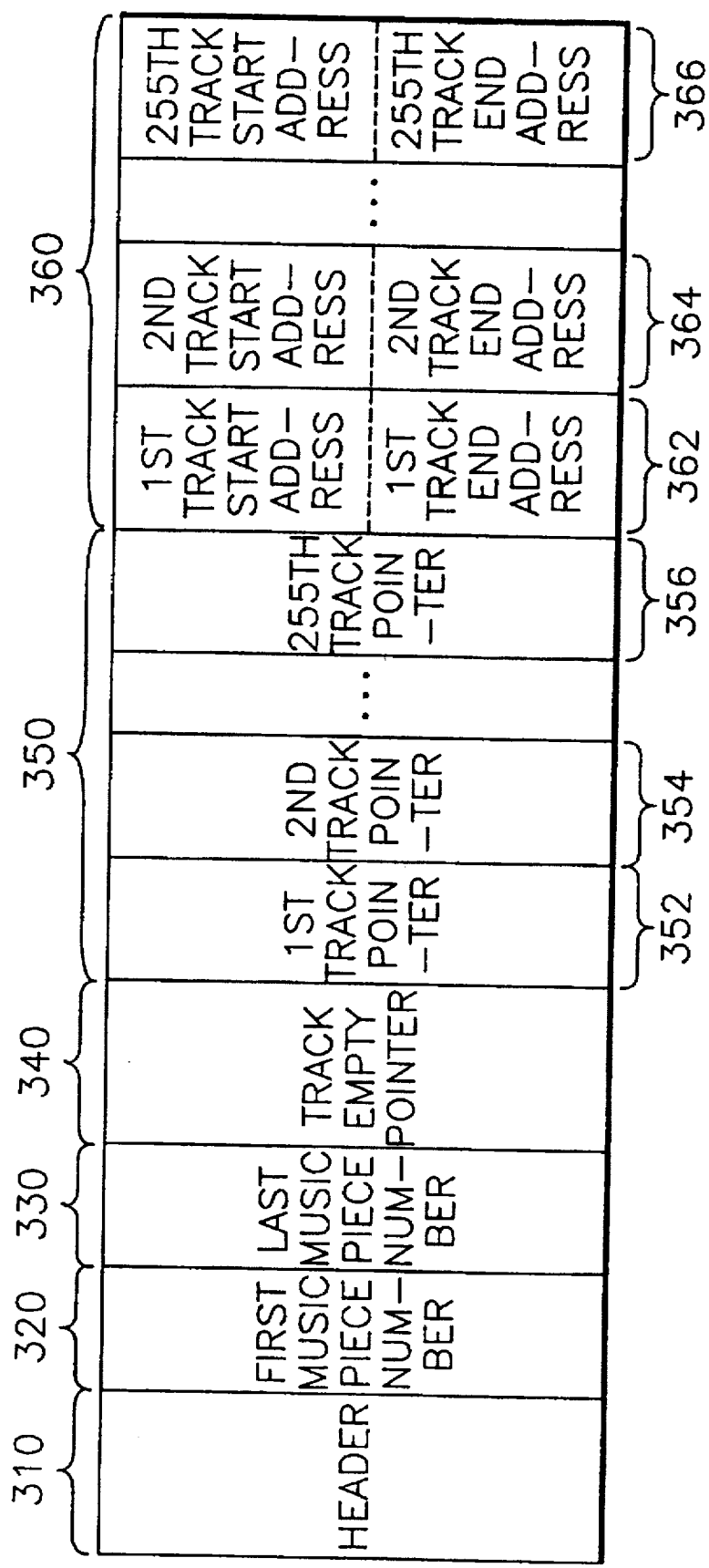
FIG. 3 is a diagram showing the format of user table of contents data.

FIG. 3 shows the format of a user table of contents data to be recorded in an optical disc. A header 310 is located at the beginning of a series of data and records various information on the data which follows the header. First and last music piece numbers 320 and 330 record the first and last music piece numbers recorded in the optical disc. A track empty pointer 340 points out the position of the presently empty track. A track pointer 350 points out the positions of respective tracks, and an address 360 indicates the start address and end address pointed by the track pointer 350.

A general recordable optical disc has 255 tracks, and the track pointer 350 is composed of 255 track pointers, i.e., a 1st track pointer 352, a 2nd track 20 pointer 354, ..., a 255th track pointer 356, for pointing out respective positions of 255 tracks. Thus, the address 360 is also composed of 255 start and end addresses 362, 364, ..., 366 corresponding to 255 tracks.

Figure 4A:
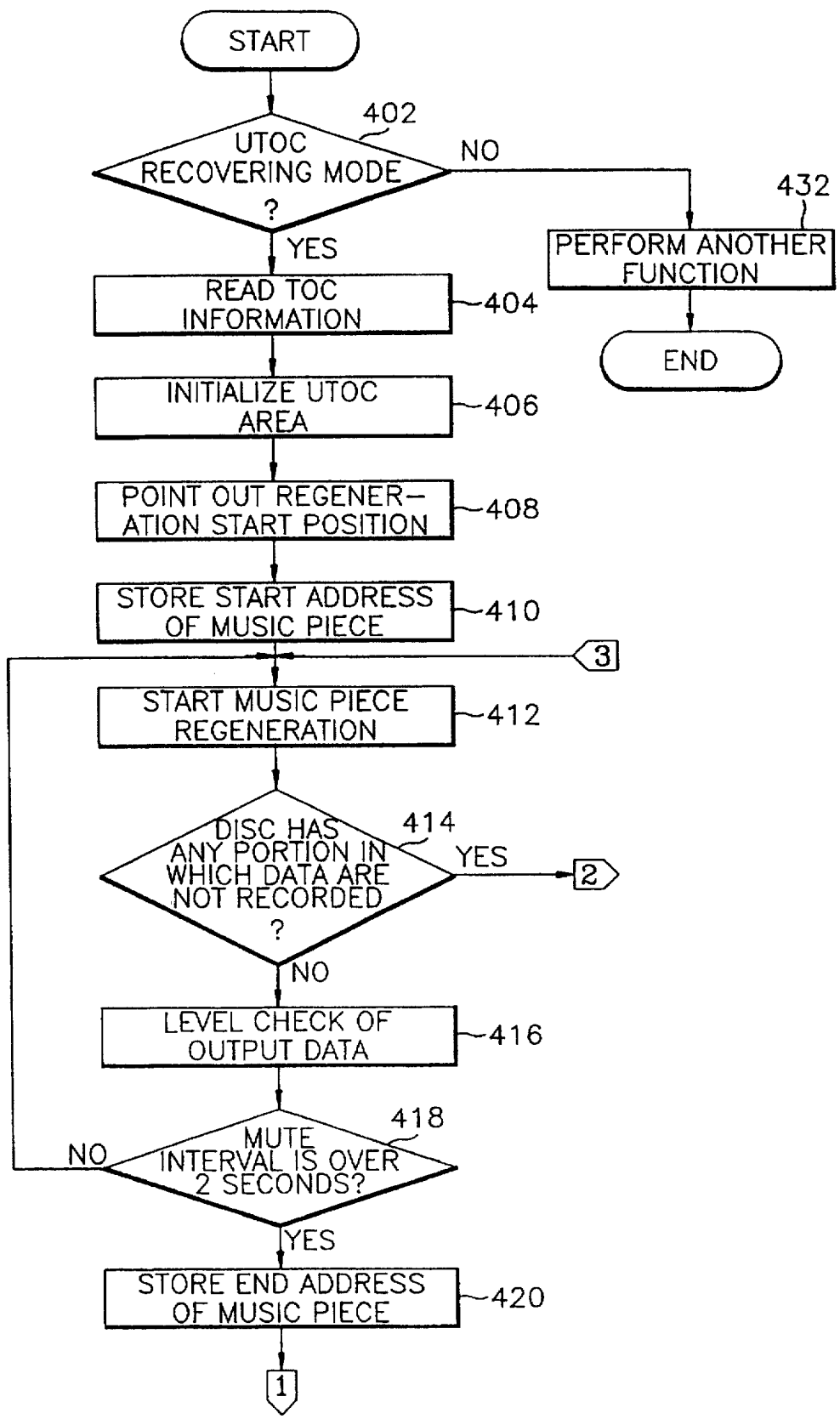
FIGS. 4A and 4B are flow charts showing the user table of contents data recovering mode according to the present invention.
Figure 4B:
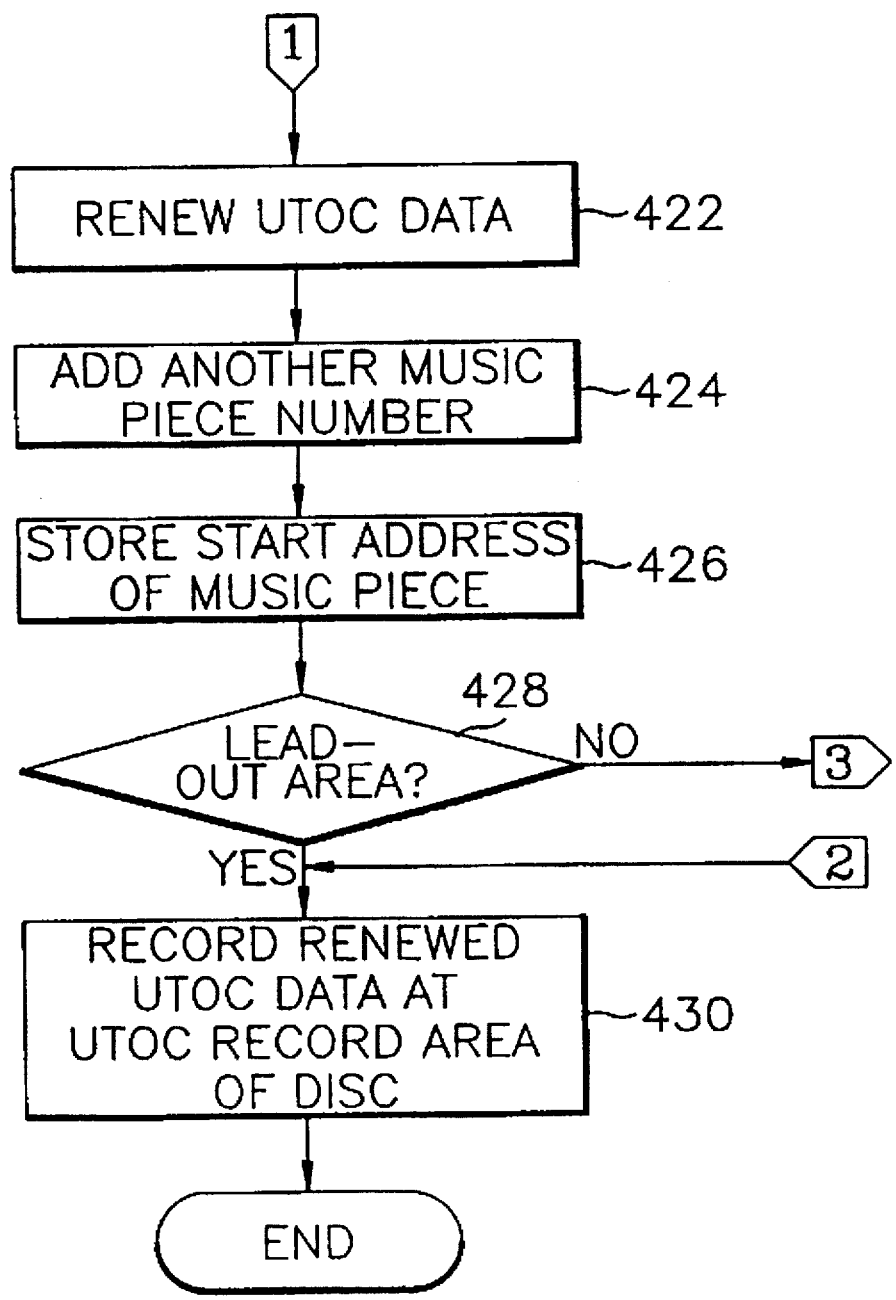

FIGS. 4A and 4B are a flow chart showing the operation of user table of contents data recovering mode according to the present invention. The operation of the user table of contents data recovering mode will now be described with reference to FIGS. 1 to 4.

At step 402, the system controller 22 of the optical disc driving apparatus checks whether or not the apparatus is in a UTOC recovering mode. If the apparatus is in the UTOC recovering mode, the information on the optical disc stored in the TOC data area of the disc 2 is read out and then is stored in the TOC data area 230 of the buffer RAM 26 at step 404. Then, at step 406, the UTOC data area 220 is 10 initialized.

At step 408, the start address of the recordable disc 2 stored at the TOC data area 230 is designated as a start position for regeneration, and the first and last music piece numbers 320 and 330 are substituted by "01", indicating the first music piece number. At this time, the track empty pointer 340 displays "01" indicating the first track, "01" is assigned to the first track pointer 352, and then the contents of the track empty pointer 340 are renewed.

At step 410, a first track start address 362 stores the regeneration start address and at step 412, the regeneration starts. At step 414, it is checked whether or not the disc has any portion in which data are not recorded for a predetermined time during the regeneration. If the disc 2 has any portion in which data are not recorded for the predetermined time, the information that the disc 2 is blank is stored at step 430 in the UTOC data area 220 of the buffer RAM 26 and the UTOC data record area of the disc 2 and then the operation ends.

If it is checked at step 414 that data are recorded in the disc 2, the recorded audio data are regenerated and the level thereof is checked at step 416. At step 418, it is checked whether or not the mute interval is greater than 2 seconds. If the mute is not greater than two seconds, the regeneration is continued.

If it is checked at step 418 that the mute interval is over 2 seconds, the address of the regenerated music piece is stored at the first track end address 362 pointed by the first track pointer 350 at step 420. And at step 422, the UTOC data information is renewed. At step 424, another music piece number is added, the contents of the track empty pointer 340 displaying "02" indicative of the second track is assigned to the second track pointer 354, and then the contents of the track empty pointer 340 is renewed. At step 426, the start address of the present music piece number which has been increased as much as the address corresponding to one sound group as compared to the end address of the regenerated first music piece is stored at the second track start address 364 pointed by the second track pointer 354, and then the last music piece number 330 is added.

At step 428, it is checked whether or not the address indicating the present position is greater than the start address of the lead-out area of the disc 2. If the present position is smaller than the start address, the audio data stored in the record area of the disc 2 are continuously regenerated. However, if the present position is greater than the start address, the renewed UTOC data representing the information on the regenerated audio data are recorded in the UTOC data area 220 of the buffer RAM 26 and the UTOC data record area of the disc 2 at step 430.

As described above, even though the recordable optical disc driving apparatus is abnormal, the present invention can regenerate the data recorded in the record area of the disc and recover the UTOC data relative to the regenerated data. Accordingly, the present invention can protect the recorded data and can eliminate the difficulty of recording or editing the data again.

What is claimed is:

1. A method of an optical disc driving apparatus which records program data and table-of-contents information relating to the program data in a data record area of an optical disc, for recovering the table-of-contents information by using said program data recorded in said data record area, said method comprising the steps of:

reproducing said program data recorded in said data record area;

evaluating said program data which is reproduced in said reproducing step, thereby producing an evaluation result;

generating the table-of-contents information relating to said program data based on said evaluation result; and recording said table-of-contents information in a user table of contents data record area of said optical disc.

2. A method of an optical disc driving apparatus comprising a RAM for storing data, said apparatus adapted to use an optical disc having a data record area for recording program data outputted from said RAM and a user table of contents data record area for recording user table of contents information relative to the program data recorded in said data record area, said method for recovering said user table of contents information relative to said data recorded in said data record area by using said program data recorded in said data record area, the method comprising the steps of:

initializing a user table of contents data area of said RAM corresponding to said user table of contents data record area;

reproducing said program data recorded in said data record area, thereby generating reproduced program data, and then storing said reproduced program data in a predetermined position of a data area of said RAM;

evaluating said reproduced program data, thereby producing an evaluation result; and recovering said user table of contents data relative to said reproduced program data stored in said data area of said RAM, based on said evaluation result, thereby producing recovered user table of contents data, and recording said recovered user table of contents data as said user table of contents information in said user table of contents data record area of said optical disc.

3. The method according to claim 2, wherein said recovering and recording step comprises the step of:

storing said recovered user table of contents data in said user table of contents data area of said RAM before recording said stored data in said user table of contents data record area of said optical disc.

4. The method according to claim 2, wherein said regenerating and storing step comprises the steps of:

reading table of contents information from said optical disc;

storing the table of contents information read from said optical disc in a table of contents data area of said RAM;

defining the predetermined position of said data area of said RAM, based on the stored table of contents information; and checking the level of said reproduced program data stored in said data record area for a mute interval, and, if the mute interval is not greater than a specific mute interval, repeatedly reproducing said program data stored in said data record area of at least one music piece number, and then storing said reproduced data at said predetermined position of said RAM.

\* \* \* \* \*